United States Patent [19]
Rippel et al.

[11] Patent Number: 5,099,186
[45] Date of Patent: Mar. 24, 1992

[54] INTEGRATED MOTOR DRIVE AND RECHARGE SYSTEM

[75] Inventors: Wally E. Rippel, Altadena; Alan G. Cocconi, Glendora, both of Calif.

[73] Assignee: General Motors Inc., Detroit, Mich.

[21] Appl. No.: 635,908

[22] Filed: Dec. 31, 1990

[51] Int. Cl.⁵ .................... H02P 5/40; H02P 1/30
[52] U.S. Cl. .................... 318/803; 318/34; 318/105; 318/107; 318/376; 318/800; 318/812; 318/441; 318/87; 318/811
[58] Field of Search .................... 318/4, 5, 8, 34, 41, 318/50, 53, 105, 112, 495, 496, 497, 599, 805, 811, 800–801, 803, 812, 87, 85, 376, 149, 157, 107, 441, 438, 254

[56] References Cited

U.S. PATENT DOCUMENTS

| | | | |
|---|---|---|---|
| 3,324,376 | 6/1967 | Hunt | 318/803 |
| 3,781,616 | 12/1973 | Mokrytzki et al. | 318/801 |
| 3,881,141 | 4/1975 | Narita | 318/87 |
| 4,041,368 | 8/1977 | Gritter | 318/803 |
| 4,208,620 | 6/1980 | Ringland | 318/50 |
| 4,237,410 | 12/1980 | Erickson et al. | 318/376 |
| 4,354,144 | 10/1982 | McCarthy | 318/149 |
| 4,503,369 | 3/1985 | Nishijima et al. | 318/254 |
| 4,920,475 | 4/1990 | Rippel | 363/132 |
| 4,999,561 | 3/1991 | Kaga et al. | 318/803 |
| 5,034,669 | 7/1991 | Sako et al. | 318/376 |

Primary Examiner—William M. Shoop, Jr.
Assistant Examiner—John W. Cabeca
Attorney, Agent, or Firm—Pretty, Schroeder, Brueggemann & Clark

[57] ABSTRACT

A drive and recharge system is disclosed that includes a bidirectional dc power source, two voltage-fed inverters, two induction motors, and a control unit. In the drive mode, power is bidirectionally connected between the dc power source and the motors. In the recharge mode, single-phase power applied to the neutral ports of the two motors is converted with unity power factor to return energy to the dc power source. An alternate scheme is also presented which uses a single motor having two sets of windings.

38 Claims, 4 Drawing Sheets

INTEGRATED MOTOR DRIVE AND RECHARGE SYSTEM

BACKGROUND OF THE INVENTION

1. Field of the Invention

This invention relates generally to motor drive systems and, more particularly, to motor drive systems that operate bidirectionally to convert and control power from a secondary battery or other bidirectional dc source to mechanical power and also to bidirectionally convert and control external ac power to dc power for battery recharging and discharging.

2. Description of the Related Art

Both the motor and power processing systems used in electrically powered vehicles have demanding requirements; cost, weight, and energy conversion efficiency are each critical. In addition, the motor power processor (termed the drive system) must be capable of efficiently handling large ranges of speed and torque for both motoring and regeneration; low torque-response times and high operational reliability are also crucial. Besides the drive system function, a recharge function is also required wherein ac line power is converted to dc power for battery recharge. The requirements of cost, weight, and energy efficiency are also critical for the recharge function. Furthermore, high power factor, low EMI, and flexibility with respect to line voltage and line frequency are also crucial.

SUMMARY OF THE INVENTION

The present invention provides a combined traction drive and battery recharge system, thus eliminating the cost, weight, and volume associated with separate, non-integrated hardware. System weight is minimized because energy storage components, such as inductors and capacitors, are minimized, drive system and battery recharge systems are optimally integrated such that one set of components serves both functions, and the need for a transmission and differential gear is eliminated. In both the drive and recharge modes, motor leakage inductance is utilized in the power processing function and no external inductors are used except for EMI purposes. Weight is further reduced in that motor control is such that peak torque can be reliably handled.

System efficiency is aided because both the transmission and differential are eliminated. Efficiency is further improved because optimal motor excitation is provided such that, for each point of operation, the optimal trade-off between conductive and magnetic losses is selected. System cost is minimized because the recharge and motoring functions are integrated. Finally, motor and inverter utilizations are maximized by virtue of the control algorithm employed.

When operating in the drive mode, the system provides motor power over all four quadrants of torque and speed; control details are such that for each torque-speed-battery voltage point of operation, system energy efficiency is optimized. Inherent features of the control enable torque to extend to maximum values that are constrained only by motor breakdown and semiconductor current limits.

Another feature of the present invention is preservation of motive power in the presence of a single-point motor or inverter failure. Still other features include providing differential action (balanced driveshaft torques) without the cost, weight, and power loss associated with a differential gear and providing limited slip and anti-skid capabilities, which can be achieved through low cost modifications of the control algorithm.

When operating in the recharge mode, controlled, unity power factor battery charging is achieved from any single-phase power source having a peak voltage that does not exceed the battery voltage. Pulse charging is also possible because the power processing elements used in the recharge mode are inherently bidirectional (i.e., energy may be extracted from the battery and returned to the utility line on a controlled basis). Another capability of the invention is that sinusoidal, regulated ac power can be provided at an input/output port. The voltage can be regulated to any value, provided its peak does not exceed the battery voltage. Accordingly, the invention serves both as an electric propulsion system and also as a stand-by or uninterruptable power system.

A drive/recharge system in accordance with the present invention include two polyphase ac motors (three-phase induction types in the preferred embodiment), each powered by a voltage-fed bridge pulse-width-modulated (PWM) inverter that, in turn, is connected to a bidirectional dc source such as a battery. With appropriate inverter controls, single-phase recharge power can be applied to the neutral nodes of the respective motor windings. Both power flow and power factor can be controlled to desired values, so long as the peak line voltage does not exceed the battery voltage. Furthermore, with similar controls, single-phase regulated ac power can be obtained from the same pair of nodes.

When operating in the drive mode, each inverter is controlled such that equal torques are produced by the two motors, independent of motor speed, thus eliminating the need for a mechanical differential. Under unusual conditions, such as in the case of an electronic failure or loss of traction, unequal torques can be commanded so that useful vehicle operation is preserved.

In the drive mode, PWM control of each of the phase poles is such that phase current is maintained proportional to symmetrically spaced sinusoidal phased references. In turn, the magnitude of each reference is proportional to a command input, while the frequency (or instantaneous phase) is controlled as a function of the sensed motor speed (or angular position) and other parameters. More specifically, in the case of induction motors, the sinusoidal reference frequency is made equal to the rotor frequency multiplied by the number of motor pole pairs plus a slip frequency, which in turn is generated as a function of two parameters, namely command current and the ratio of motor speed to battery voltage. The above two-parameter function may be chosen such that optimal system efficiency is achieved for each torque-speed point of operation. For synchronous type motors, a similar strategy is used, where the reference signal phase (rather than slip frequency) is controlled as a two-parameter function of commanded current and the quotient of motor speed and battery voltage.

When operating in the recharge mode, modulation control is such that, within each inverter, one or more of the phase currents are maintained proportional to a sinusoidal reference, which in turn is in phase with the utility line voltage. For an N-phase system, any number of phases between 1 and N can be thusly controlled (in each of the two inverters); those phases not controlled are disabled (both high-side and low-side switches are maintained off). The above proportionality constants can, in turn, be derived as a function of battery parameters, thus enabling recharge control. Finally, the drive/recharge system can include a single polyphase ac motor powered by twin inverters.

Other features and advantages of the present invention should be apparent from the following description of the preferred embodiments, which illustrate, by way of example, the principles of the invention.

DESCRIPTION OF THE PREFERRED EMBODIMENTS

The following description of the present invention is not to be taken in a limiting sense, but is made merely for the purpose of illustrating the general principles of the invention. The following detailed description is of the best presently contemplated modes of carrying out the present invention.

Figure 1:
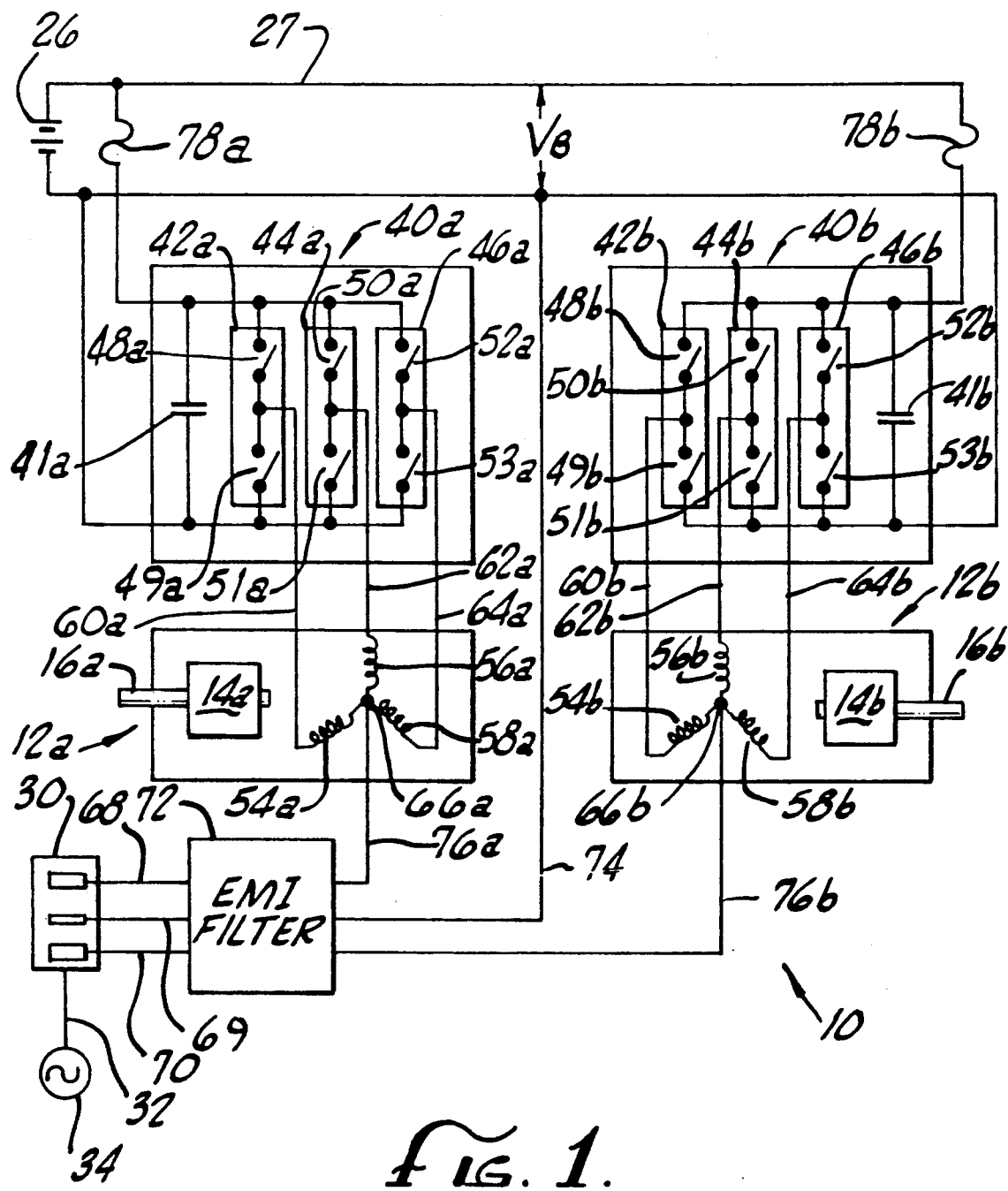
FIG. 1 is a block diagram of a motor drive-recharge system in accordance with the present invention, showing the primary power handling components for a two-motor arrangement.

A motor drive/recharge system 10 constructed in accordance with the present invention is illustrated in FIG. 1, and includes first and second induction motors 12a and 12b, respectively, that convert electrical power to mechanical power delivered at their rotors 14a and 14b to their output shafts 16a and 16b, respectively.

In general, the drawing reference numerals will be designated with an "a" suffix for components associated with the first motor 12a, and will be designated with a "b" suffix for components associated with the second motor 12b. In this discussion, when references to such components are made without an "a" or "b" suffix, the discussion applies equally to each motor A bidirectional dc power source, such as a battery 26, is connected to the motors via an electrical bus 27 and inverters 40a and 40b. The power source can be a secondary battery or any energy storage system that produces a dc voltage output and is capable of handling currents of either polarity.

The motor drive/recharge system 10 of FIG. 1 provides motoring and battery recharging functions in one integrated system that uses many of the same components to perform the two functions, thus reducing the cost, weight, and volume associated with systems having separate motoring and recharging systems.

In the driving mode, the system provides a broad range of torque and motor speed combinations, and for each combination of torque, speed, and battery voltage, the system energy efficiency is optimized by implementation of appropriate control algorithms that will be known to those skilled in the art, and as described more fully below. In the recharging mode, controlled, unity power factor battery charging is accomplished via an input/output port 30 that is connected via a utility line 32 to any single phase ac power line source 34 having a peak voltage that does not exceed the battery voltage. Pulse charging is also possible in that the power processing elements used in the recharging mode are inherently bidirectional. That is, electrical energy can be extracted from the system battery 26 and returned to the ac power utility line source 34 at the input/output port 30 on a controlled basis. In addition, sinusoidal, regulated ac power can also be provided to external devices at the system's input/output port. The voltage provided by the system can be regulated to any value, provided its peak value does not exceed the battery voltage. In this way, the system serves as both an electric propulsion system and also as a power delivery system.

Referring to FIG. 1, the inverters 40 are voltage-fed, pulse width modulated (PWM) units. While three-phase configurations are preferred, other phase multiplicities are also acceptable. Each inverter consists of an input capacitor 41 and phase poles 42, 44, and 46, plus control circuitry described below. The control circuitry commands a pair of solid state switches associated with each of the three poles to open and close at appropriate times.

The solid state switches comprise a first pair of switches 48 and 49 for the first pole 42, a second pair 50 and 51 for the second pole 44, and a third pair 52 and 53 for the third pole 46. Each inverter 40 is connected to the windings of its respective motor by three phase lines 60, 62, and 64. Each motor includes three windings 54, 56, and 58, arranged in a wye-configuration, connected to the phase lines at one end and connected to a common neutral node 66 at the other.

Each inverter 40 is connected to the dc energy source 26 as shown with a fuse 78 (or other protective device) serially connected. Phase outputs 60, 62, and 64 of each inverter are connected to the stator windings 54, 56, and 58 of each motor 12. Neutral lines 76 from each of the two motors are connected to an EMI filter 72 that, in turn, is connected to the input/output port 30. With the appropriate control algorithm (see FIG. 5), single-phase power applied to connecting lines 68 and 70 can be converted into recharge current that is applied to the dc energy source 26. Furthermore, with the appropriate control algorithm, the currents on the connecting lines 68 and 70 will be sinusoidal and in-phase with the applied input voltage, thus effecting unity power factor. It should also be noted that energy can be returned to the input/output port 30. In particular, the control algorithm may be such that a sinusoidal voltage of desired voltage and frequency is established between the connecting lines 68 and 70. This feature can be exploited to achieve pulse charging, wherein energy pulses are extracted from the dc energy source 26 and periodically returned to the utility line 32 connected to the input/output port 30. A ground line 69 is provided for both safety and filtering purposes. Likewise, the connection 74 from the EMI filter 72 to the bus 27 is for the purpose of returning high frequency currents associated with the filtering action.

Each rotor shaft 16 may be connected to a drive wheel, either directly or through a fixed ratio reduction gear (or device of similar function). This eliminates the need for a mechanical transmission and differential, thereby saving weight and cost. With the appropriate control algorithm for each of the two inverters 40, the following torque-speed characteristics can be achieved in the driving mode:

1. For motor speed differences less than a threshold value, the two motor torques are mutually equal and are determined by a command input. Both positive and negative torques are commandable for each direction of rotation.
2. When the speed difference between the two motors exceeds a threshold, torque is increased for the lower speed motor and reduced for the higher speed motor, thus effecting the function of a limited-slip differential gear.
3. In the event of an inverter or motor failure, the control function specified in item 2 above can be either manually or automatically over-ridden so that normal operation of the remaining inverter-motor is possible, thus providing redundant operation.

The rotors 14 of the motors 12 are of the squirrel-cage type in the preferred embodiment. Other rotor types, such as permanent magnet, are also possible.

Figure 2:
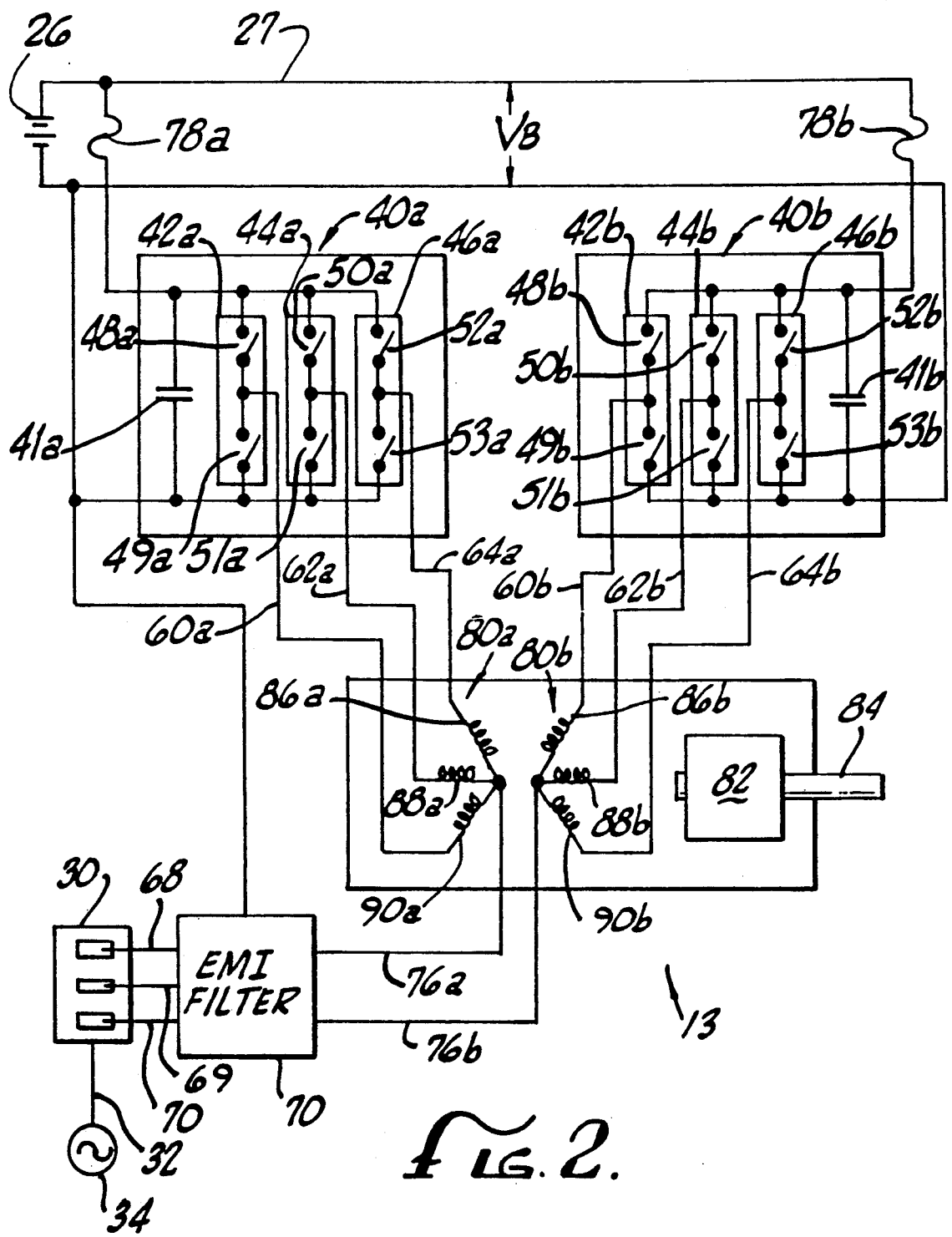
FIG. 2 is a block diagram of a second embodiment of a motor drive-recharge system in accordance with the present invention, showing the primary power handling components for a single motor arrangement with dual sets of windings.

A system similar to the two-motor scheme of FIG. 1 is illustrated in FIG. 2, wherein a single motor 13 is constructed in accordance with the present invention, having two coupled sets of stator windings 80a and 80b comprising two motor halves. The FIG. 2 structure can be applied to traction and variable speed drive systems, as discussed above for the two-motor application. The motor 13 includes a rotor 82 and a motor shaft 84. For vehicle applications, the shaft can be coupled directly to a single wheel or coupled to two wheels via a reduction-differential gear or a transmission-differential gear combination. As with the two-motor structure of FIG. 1, four quadrants of controlled torque and speed are possible. That is, all possible combinations of positive and negative torque and positive and negative speed can be achieved. Furthermore, also as with the two-motor arrangement, single-phase power can be either extracted from, or delivered to, the input/output port 30. In particular, controlled unity power factor recharging is possible for any single-phase ac utility line having a peak voltage that does not exceed the dc bus voltage $V_B$.

Each set of stator windings 80a and 80b in FIG. 2 includes three windings 86, 88, and 90. Electrically, the first set of windings 86a, 88a, and 90a is analogous to the first motor windings of the two-motor arrangement discussed above, and the second set of windings 86b, 88b, and 90b is analogous to the second motor windings. Thus, the first set of windings are connected to a first inverter 40a and the second set of motor windings are connected to a second inverter 40b. As before, the inverters 40 are connected to a bidirectional dc power source 26 via an electric bus 27. In all other respects, the inverters of FIG. 2 are like those of FIG. 1.

Figure 3:
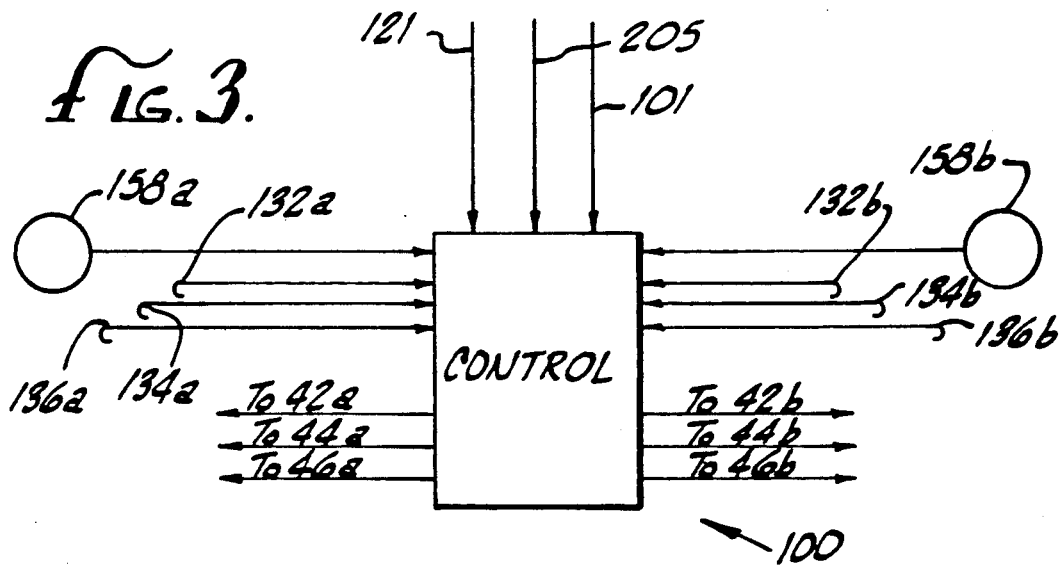
FIG. 3 is a block diagram of the motor control circuitry inputs and outputs for the system illustrated in FIG. 1.

FIG. 3 illustrates that control circuitry 100 receives current signals from current sensors 132a, 134a, 136a associated with the control lines 60a, 62a, and 64a, respectively, and from current sensors 132b, 134b, and 136b associated with the control lines 60b, 62b, and 64b, respectively. The control circuitry also receives a drive current command signal $V_C$ over an input line 121, a recharge current command signal over a line 205, and a mode command input signal over a line 101 that selects the control block operating mode between driving and recharging. Finally, two tachometers 158a and 158b supply a motor speed signal for each motor 12a and 12b, respectively. The control circuitry provides output signals to the phase poles 42-46. The control circuitry 100 is described further below in connection with FIGS. 4 and 5.

Figure 4:
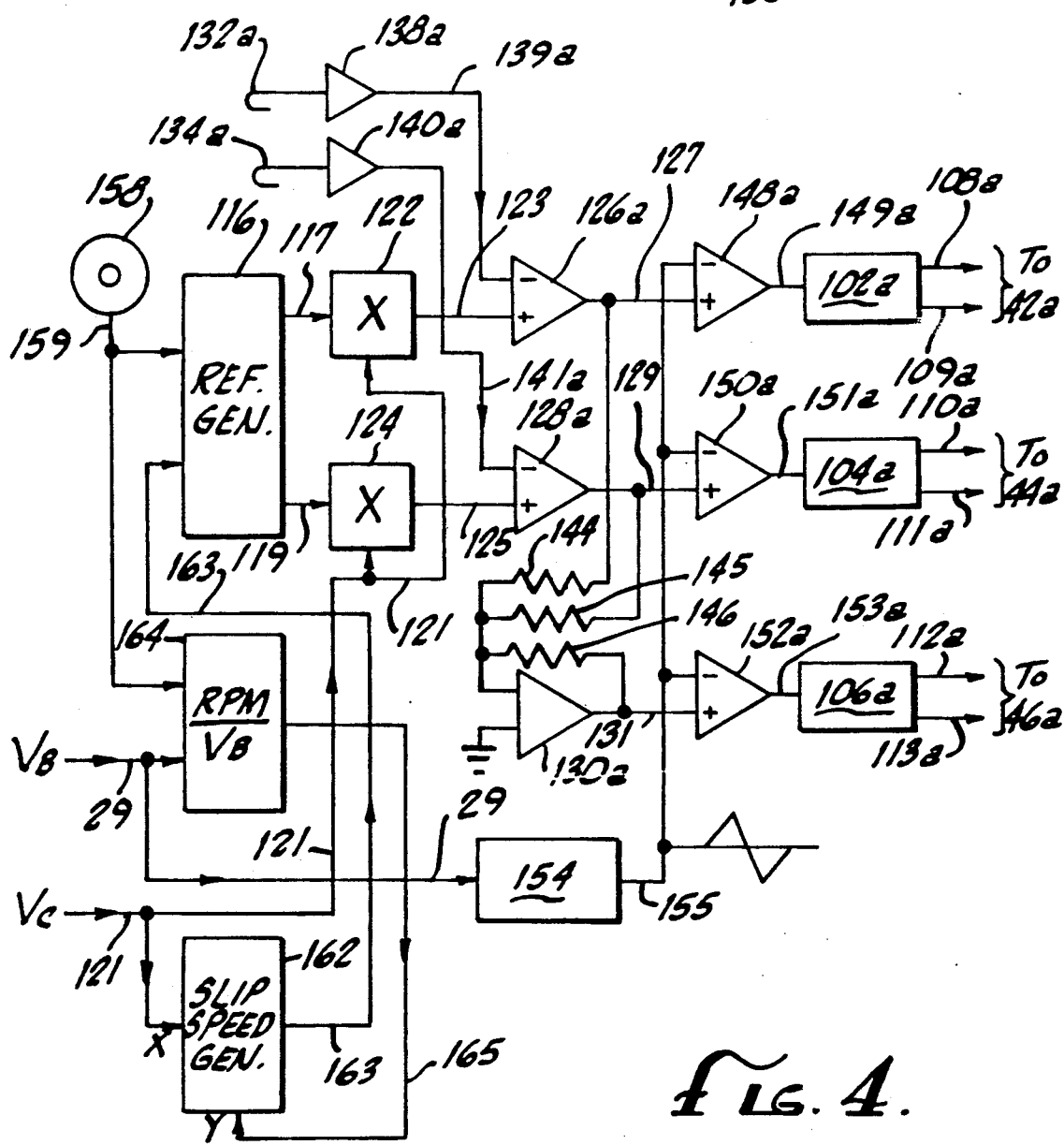
FIG. 4 is a block diagram of the control elements associated with each of the inverters of the system illustrated in FIG. 1 used in the drive mode.

FIG. 4 depicts the major control blocks of the control circuitry 100 which, in the driving mode, generate the required on and off signals for the semiconductor switches 48a through 53a used in the first inverter 40a. In the case of the FIG. 1 two-motor system, a second set of similar control blocks is used to control the semiconductor switches 48b through 53b found in the second inverter 40b. In the case of the FIG. 2 single motor system, control blocks for the two inverters may be integrated to some degree. While FIG. 4 applies specifically to a three-phase scheme, the approach can be generalized to apply for any number of phases.

In the FIG. 1 embodiment, which uses two three-phase induction motors, the control blocks illustrated in FIG. 4 control the phase currents on the control lines 60, 62, and 64 during the drive mode to meet the following four criteria:

1. First, the fundamental current components are mutually spaced 120° apart in time.
2. Second, the frequency $F_e$ of the phase currents is equal to $$F_e = N_p \cdot F_m + F_s$$

where $N_p$ is the number of pole pairs in the motor, $F_m$ is the motor shaft rotation frequency, and $F_s$ is the motor slip frequency, whose value is a function of commanded current, sensed motor speed, and sensed battery voltage. The values of $F_m$, $F_e$, and $F_s$ can each have a positive or negative sign corresponding to the rotation direction of the motor shaft and the direction of torque.

3. The third criteria is that the magnitude of the phase currents is maintained proportional to the current commanded input signal $V_c$.
4. Finally, the last criteria is that the high frequency switching current harmonics on the control lines 60, 62, and 64 are symmetrically spaced in time so that losses on the input capacitor 41 are minimized. All four criteria are met by the system illustrated in FIG. 4.

The operation of the FIG. 4 control blocks is as follows. The two-phase tachometer 158 provides input pulses over line 159 to a reference generator 116. These pulses are combined with a slip frequency command signal corresponding to $F_s$ over a line 163 from a slip speed generator 162. The reference generator 116 produces output signals that conform to the following relationships:

$$V_{1a} = V_0 \sin 2\pi F_e t$$

$$V_{1b} = V_0 \sin 2\pi (F_e + 1/3) t$$

where $V_{1a}$ is the voltage over line 117, $V_{1b}$ is the voltage over line 119, $V_0$ is a constant term, and t is elapsed time.

The phase reference signal generator 116 may be implemented in a variety of ways. In the preferred embodiment, the generator is digitally implemented, and in particular, counters add phase signals corresponding respectively to the input pulses from the tachometer 158 and the slip speed generator 162 over lines 159 and 163, respectively. The added signal is then applied to look-up tables whose entries correspond to a sine function that appears as $V_{1a}$ at the first output line 117 and a 120° phase-shifted sine function that appears as $V_{1b}$ at the second output line 119.

The voltage signals $V_{1a}$ and $V_{1b}$ are then applied to multipliers 122 and 124, wherein the voltage signals are each multiplied by the current command signal $V_c$ that appears on input line 121. The multiplier outputs are given by the equations:

$$V_{2a} = K_1 V_{1a} V_c$$

$$V_{2b} = K_1 V_{1b} V_c$$

where $V_{2a}$ appears on a first line 123, $V_{2b}$ appears on a second line 125, and $K_1$ is a constant term. The voltage signals $V_{2a}$ and $V_{2b}$ serve as reference signals that, in turn, command the phase currents for two of the three phases.

Current sensors 132a and 134a (with the aid of sensor amplifiers 138a and 140a) provide signals on lines 139a and 141a which are replicas of the phase currents in lines 60a and 62a. Amplifiers 126a and 128a then compare the current sense signals with the above reference signals to generate error signals appearing respectively on lines 127 and 129. In turn, these error signals respectively command duty cycles for poles 42a and 44a such that the desired phase currents are maintained. The third phase, corresponding to pole 46a, is slaved such that its duty cycle is made equal to the negative sum of the phase one and phase two duty cycles. This is achieved by producing an error signal for phase three which is the negative sum of the phase one and phase two error signals; an amplifier 130a plus resistors 144, 145, and 146 accomplish this.

The three error signals appearing at lines 127, 129, and 131 are then converted into duty cycle signals via comparators 148a, 150a, and 152a, respectively, and a triangle oscillator 154 that operates at the desired switching frequency. A signal on input line 29, which is proportional to source voltage $V_B$, in turn controls the output amplitude of the oscillator 154 to be proportional to $V_B$. This maintains feedback loop gains that are independent of $V_B$ and thereby enables optimal control dynamics over a wide range of $V_B$.

Drivers 102a, 104a, and 106a accept duty cycle inputs on lines 149a, 151a, and 153a and provide outputs on lines 108a, 110a, and 112a plus complementary outputs on lines 109a, 111a, and 113a. In turn, the outputs on lines 108a, 110a, and 112a respectively drive the semiconductor switches 48a, 50a, and 52a, while the complementary outputs drive the semiconductor switches 49a, 51a, and 53a. Elements of amplification, logic and sensing may be included within each driver to achieve such functions as shut-down in response to over-current, over-voltage, or over-temperature conditions. "Dead-time" may also be provided (time where both semiconductor switches are maintained off following transitions between low-side and high-side conduction states).

The slip frequency command signal appearing on line 163 is produced by a slip speed generator 162. The generator produces this output as a joint function of two input signals—one, appearing on line 121, corresponds to commanded current, and the other, appearing on line 165, corresponds to the ratio of motor speed to voltage, $V_B$. The specific function between the slip speed generator output and the two input signals of 162 can be chosen such that optimal system efficiency is achieved for each torque-speed-voltage point. Other criteria may also be used. Implementation of the slip speed generator 162 is achieved via a two-dimensional digital look-up table in the preferred embodiment.

The signal on line 165 that corresponds to the quotient of motor speed and voltage, $V_B$, is produced by a generator 164 that receives a tachometer signal on line 159 and a signal corresponding to $V_B$ on line 29.

Figure 5:
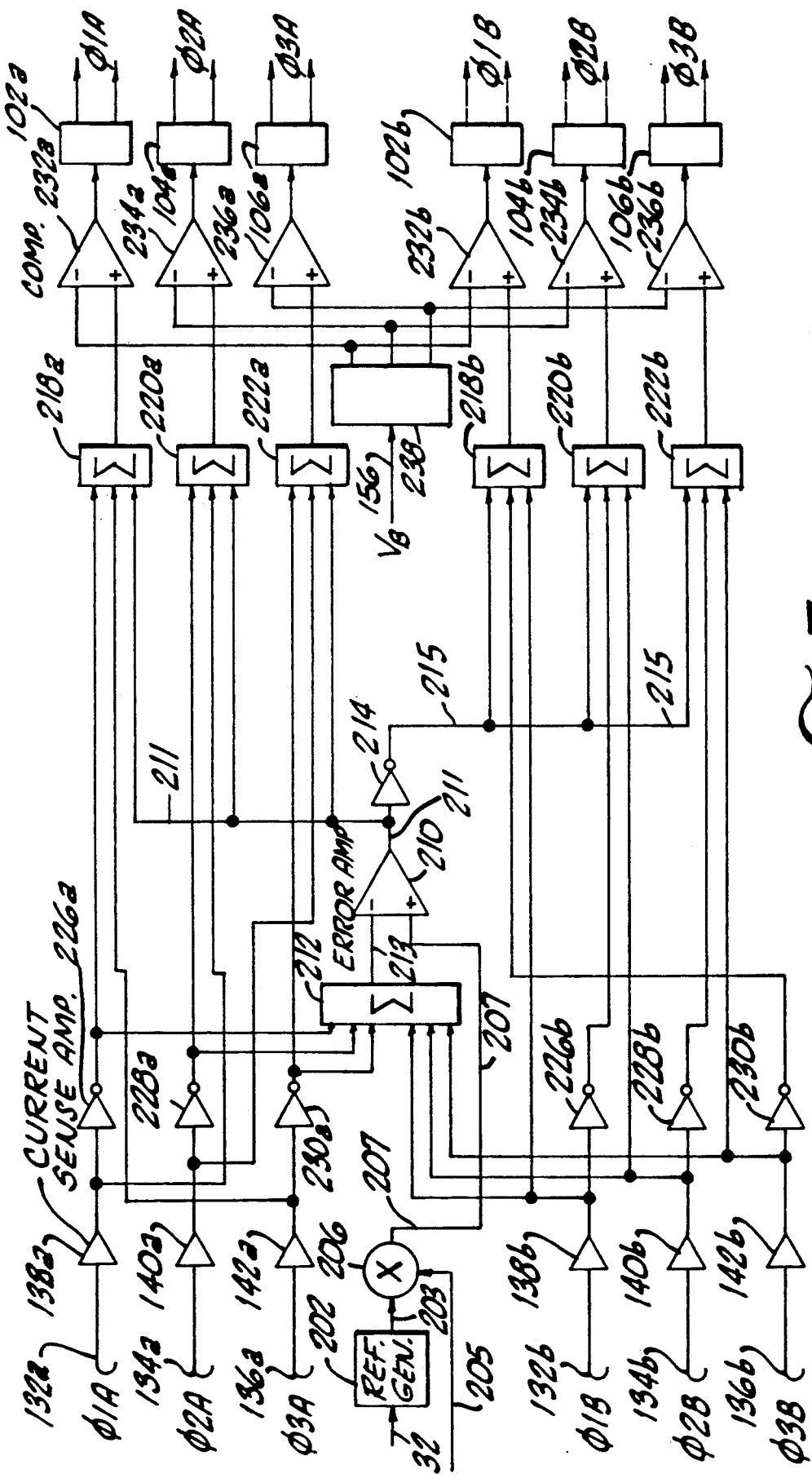
FIG. 5 is a block diagram of the control elements associated with each of the inverters of the system illustrated in FIG. 1 used in the recharge mode.

FIG. 5 illustrates the major control blocks that, in the recharge mode, generate the required on and off signals for the semiconductor switches 48a–53a and 48b–53b used in the inverters 40a and 40b.

A reference generator 202 provides a sinusoidal output reference voltage on a line 203 that is in-phase with the voltage appearing between the recharge lines 68 and 70. The generator 202 may be either a simple scaling amplifier or a sine generator which is locked to the utility line 32 via a phase-locked-loop circuit.

The signal on the line 203 is applied to a multiplier 206, where it is multiplied by a recharge current command signal appearing on an input line 205. The multiplier output, appearing on line 207, is then compared, via an amplifier 210, with a signal on line 213 representing the average of all sensed currents. In turn, the line 213 signal is derived from a summation amplifier 212 that adds current sense signals from the inverter 40b with inverted current sense signals from the inverter 40a. The inverted current sense signals are provided by inverters 226a, 228a, and 230a. In turn, the error output of the amplifier 210, appearing on line 211, commands sinusoidal currents in the inverter 40a, while a complement signal appearing on line 215 commands opposite polarity currents in the inverter 40b.

In order to insure current balance between the different phases, an error signal representing the difference between the sensed phase current and the sensed current of an adjacent phase is added to the original error signals on lines 211 and 215. For each phase, the above summation is performed by designated amplifiers 218a–222a and 218b–222b. Finally, duty cycle generation is performed by comparators 232a–236a and 232b–236b that compare the above error outputs with triangle signals generated by a three-phase oscillator 238. By using a polyphase, rather than a single-phase oscillator, optimal cancellation of current harmonics is achieved, which results in minimized requirements for the line filter 72. As with the FIG. 4 drive-mode controls, the oscillator amplitude is maintained proportional to $V_B$ so that control loop gains are made independent of $V_B$.

It should be noted that it is not necessary to include all three phases as shown in FIG. 5. Depending on the maximum desired recharge power levels (and degree of current harmonic cancellation desired), one or two phases may suffice. In all cases, the oscillator phase multiplicity must correspond to the number of inverter phases utilized during recharge. Unused inverter phases must be disabled by maintaining both high-side and low-side semiconductor switches in the off-state during recharge.

In accordance with the present invention, a motor system is provided with integrated driving and battery recharging capability such that a single integrated system performs both functions. This minimizes the need for energy storage components and eliminates the need for a separate mechanical transmission and differential, reducing weight and increasing efficiency. In the driving mode, the system provides power over a broad range of torque and speed, and advantageously selects the optimal trade-off between conductive and magnetic losses for each point of motor operation, thereby maximizing system efficiency. In the recharging mode, a controlled unity power factor battery recharging is achieved using any single phase power source having a peak voltage that does not exceed the battery voltage. Pulsed charging can be achieved such that energy can be extracted from the battery and returned to the ac source line at a recharge port. In addition, regulated ac power can be produced by the system and provided at the recharge port for use by external devices.

While the present invention has been described with respect to preferred embodiments, it is to be understood that variations will occur to those skilled in the art. Motors other than three-phase induction motors, for example, can be used without departing from the teachings of the present invention. The invention, therefore, should not be seen as limited to the particular apparatus described herein, but it should be understood that the present invention has wide applicability with respect to systems having drive and recharge capabilities. Such alternative configurations can be achieved by those skilled in the art in view of the description above.

We claim:

1. An electric motor drive and power processing system comprising:
   a first polyphase motor having windings in a wye configuration and a rotor with an output shaft, with a first neutral node in common with all the first motor windings;
   a second polyphase motor having windings in a wye configuration and a rotor with an output shaft, with a second neutral node in common with all the second motor windings;
   bidirectional dc power source means for providing and receiving electrical power to and from the first and second motors;
   a first bidirectional, polyphase, voltage-fed, pulse-width-modulated inverter, having a phase multiplicity equal to that of the first motor, connected between the bidirectional dc power source means and the windings of the first motor;
   a second bidirectional, polyphase, voltage-fed, pulse-width-modulated inverter, having a phase multiplicity equal to that of the second motor, connected between the bidirectional dc power source means and the windings of the second motor;
   an input/output terminal connected to the first and second neutral nodes of the motors; and
   control means, coupled to the first and second inverters, for operation in a drive mode and a recharge mode, for controlling the first and second inverters during the drive mode such that electrical power provided to the motors from the bidirectional dc power source means is converted to mechanical power produced at the first and second motor output shafts, and mechanical power from rotation of the first and second motor output shafts is converted to dc electrical power provided to the bidirectional dc power source means, and for controlling the first and second inverters during the recharge mode such that single-phase ac electrical power received at the input/output terminal is converted to dc power that is provided to the bidirectional dc power source means at a unity power factor conversion.

2. An electric motor drive and power processing control system as defined in claim 1, wherein the bidirectional dc power source means is a battery.

3. An electric motor drive and power processing system as defined in claim 1, wherein the first and second motors are induction motors.

4. An electric motor drive and power processing system as defined in claim 1, further including filter means located between the motors and the input/output terminal for reducing common and differential mode high frequency currents appearing at the input/output terminal.

5. An electric motor drive and power processing system as defined in claim 1, wherein the input/output terminal is adapted to be connected to a single-phase ac electric utility line.

6. An electric motor drive and power processing system as defined in claim 1, wherein the input/output terminal accepts both dc and ac electrical power, and wherein both types of electrical power can be converted under control of the control means to provide dc electrical power to the bidirectional dc power source means.

7. An electric motor drive and power processing system as defined in claim 1, wherein the control means controls the first and second inverters such that dc electrical power from the bidirectional dc power source means is converted to single-phase ac electrical power provided to the input/output terminal at a unity power factor conversion.

8. An electric motor drive and power processing system as defined in claim 1, wherein the control means controls the first and second inverters such that dc electrical power applied at the input/output terminal is provided to the bidirectional dc power source means.

9. An electric motor drive and power processing system as defined in claim 1, wherein the control means controls the first and second inverters such that dc electrical power from the bidirectional dc power source means is converted to dc electrical power delivered to the input/output terminal 10. An electric motor drive and power processing system as defined in claim 1, wherein the control means includes reference generator means, coupled to the inverters, for generating sinusoidal reference signals to control the inverters.

11. An electric motor drive and power processing system as defined in claim 10, wherein the inverters include switching means for opening and closing an electrical circuit path within the inverters.

12. An electric motor drive and power processing system as defined in claim 11, wherein:
   the switching means comprises semiconductor switching elements that open and close; and
   the control means includes reference generator means for generating sinusoidal reference signals that are provided to the inverter switching means of both motors to control opening and closing of the switching elements.

13. An electric motor drive and power processing system as defined in claim 12, further including:
   first motor speed means for producing a motor speed signal indicative of the first motor's output shaft speed;
   second motor speed means for producing a motor speed signal indicative of the second motor's output shaft speed; and slip frequency generating means for generating a motor slip frequency signal that is provided to the reference generator means, the slip frequency signal being based on a current command signal and on the motor speed signal received from the first and second motor speed means.

14. An electric motor drive and power processing system as defined in claim 1, wherein the control means includes driver means for producing drive signals to control the inverters.

15. An electric motor drive and power processing system as defined in claim 14, wherein the control means further includes first and second control block means for the first and second motors, respectively, such that each control block includes:

tachometer means for providing a signal corresponding to the speed of the respective motor;

a signal generator that produces an output signal corresponding to the quotient of the respective motor speed divided by the voltage of the dc power source means;

slip speed generator means for receiving the output signal from the signal generator and producing a slip frequency command signal; and reference generator means for receiving the slip frequency command signal and producing sinusoidal output signals that are multiplied by a current command signal and then provided to the driver means to produce the drive signals.

16. An electric motor drive and power processing system as defined in claim 15, wherein:

the first and second motors are both three-phase motors; and the driver means includes a driver associated with each motor phase of each motor.

17. An electric motor drive and power processing system as defined in claim 16, wherein the control means further includes:

first and second current sensors associated with each motor that provide current phase signals for a first and second one of the motor phases for each motor, wherein the reference generator means produces first and second sinusoidal output signals corresponding to the first and second motor phases.

18. An electric motor drive and power processing system as defined in claim 17, wherein the control means further includes:

error signal means for receiving the first and second current sensor signals of each motor and comparing them with the first and second sinusoidal output signals to produce first and second error signals indicative of the difference between the signals, and for producing a third error signal that is the negative sum of the first and second error signals;

oscillator means for producing a triangle ramp signal having a predetermined frequency and an amplitude proportional to the voltage of the dc power source means; and comparator means for receiving the error signals and the triangle oscillation signal and for producing duty cycle signals provided to the drivers.

19. An electric motor drive and power processing system as defined in claim 18, wherein the input/output terminal is adapted to be connected to a single-phase ac electric utility line and includes a power line, a neutral line, and a ground line;

and wherein the control means further includes:

reference means for producing a sinusoidal reference voltage that is in phase with the voltage appearing between the power line and neutral line;

multiplier means for multiplying the sinusoidal reference voltage by a recharge command signal, producing a multiplied reference voltage;

a third current sensor associated with each motor that provides a current phase signal associated with the third motor phases for each motor;

summation means for summing the current phase signals from the first, second, and third current sensors associated with the second inverter of each motor with the inverted current phase signals from the first, second, and third current sensors associated with the first inverter of each motor, producing an average current signal;

recharge error means for receiving the average current signal and the multiplied reference voltage to produce a recharge error signal;

error summation means for producing error signals for summing the difference between the sensed current phase signal of each motor phase and the sensed current phase signal of an adjacent motor phase with the recharge error signal;

three-phase oscillator means for producing triangle signals having predetermined frequencies and amplitudes that are proportional to the voltage of the bidirectional dc power source means; and duty cycle means for generating duty cycle signals provided to the inverters by comparing the recharge error signals with the triangle signals.

20. An electric motor drive and power processing control system comprising:

a polyphase motor having windings in a wye configuration, defining a first set of windings and a second set of windings, further having a rotor with an output shaft, a first neutral node in common with all the first set of motor windings, and a second neutral node in common with all the second set of motor windings;

bidirectional dc power source means for providing and receiving electrical power to and from the motor;

a first bidirectional, polyphase, voltage-fed, pulse-width-modulated inverter, having a phase multiplicity equal to that of the first set of windings, connected between the bidirectional dc power source means and the first set of windings;

a second bidirectional, polyphase, voltage-fed, pulse-width-modulated inverter, having a phase multiplicity equal to that of the second set of windings, connected between the bidirectional dc power source means and the second set of windings;

an input/output terminal connected to the first and second neutral nodes defining a common external connection port to the first and second neutral nodes; and control means, coupled to the first and second inverters, for operation in a drive mode and a recharge mode, for controlling the first and second inverters during the drive mode such that electrical power provided to the motor from the bidirectional dc power source means is converted to mechanical power produced at the motor output shaft, and mechanical power from rotation of the motor output shaft is converted to dc electrical power provided to the bidirectional dc power source means, and for controlling the first and second inverters during the recharge mode such that single-phase ac electrical power received at the input/output terminal is converted to dc power that is provided to the bidirectional dc power source means at a unity power factor conversion.

21. An electric motor drive and power processing system as defined in claim 20, wherein the motor is an induction motor.

22. An electric motor drive and power processing system as defined in claim 20, further including:
   filter means located between the motor and the input/output terminal for reducing common and differential mode high frequency currents appearing at the input/output terminal.

23. An electric motor drive and power processing system as defined in claim 20, wherein the input/output terminal is adapted to be connected to a single-phase ac electric utility line.

24. An electric motor drive and power processing system as defined in claim 20, wherein the control means controls the first and second inverters such that single-phase ac electrical power applied at the input/output terminal is converted to dc power that is applied to the dc power source means at a unity power factor conversion.

25. An electric motor drive and power processing system as defined in claim 20, wherein the control means controls the first and second inverters such that dc electrical power from the dc power source means is converted to single-phase electrical power delivered to the input/output terminal.

26. An electric motor drive and power processing system as defined in claim 20, wherein the control means controls the first and second inverters such that dc electrical power applied at the input/output terminal is provided to the bidirectional dc power source means.

27. An electric motor drive and power processing system as defined in claim 20, wherein the control means controls the first and second inverters such that dc electrical power from the bidirectional dc power source means is converted to dc power delivered to the input/output terminal.

28. An electric motor drive and power processing system as defined in claim 20, wherein the control means further includes reference generator means, coupled to the inverters, for generating sinusoidal reference signals to control the flow of electrical power through the inverters.

29. An electric motor drive and power processing system as defined in claim 20, wherein the inverters include switching means for opening and closing an electrical circuit path within the inverters.

30. An electric motor drive and power processing system as defined in claim 29, wherein:
   the switching means comprises semiconductor switching elements that open and close; and
   the control means further includes reference generator means for generating sinusoidal reference signals that are provided to the inverter switching means to control opening and closing of the switching elements.

31. An electric motor drive and power processing system as defined in claim 30, further including:
   motor speed means for producing a motor speed signal indicative of the motor's output shaft speed; and
   slip frequency generating means for generating a motor slip frequency signal for the motor that is provided to the reference generator means, the slip frequency signal being based on a current command signal and on the motor speed signal received from the motor speed means.

32. An electric motor drive and power processing control system comprising:
   a first polyphase motor having windings in a wye configuration with a first neutral node;
   a second polyphase motor having windings in a wye configuration with a second neutral node;
   bidirectional dc power source means for providing dc electrical power to the first and second motors and for receiving dc electrical power;
   a first polyphase, voltage-fed, pulse-width-modulated inverter having switching elements for controlling the flow of electrical power between the dc power source means to the windings of the first motor;
   a second polyphase, voltage-fed, pulse-width-modulated inverter having switching elements for controlling the flow of electrical power between the dc power source means to the windings of the second motor; and
   an input/output terminal connecting the first and second neutral nodes;
   wherein the switching elements of the first and second inverters are switched such that single-phase ac electrical power applied at the input/output terminal is applied to the dc power source means in a unity power factor conversion, dc electrical power from the dc power source means is converted to single-phase electrical power delivered to the input/output terminal, dc electrical power at the input/output terminal is provided to the dc power source means, and dc electrical power from the dc power source means is converted to dc power delivered to the input/output terminal.

33. An electric motor drive and power processing system as defined in claim 32, wherein each motor is an induction motor, the system further including current sensing means for sensing the current phase in the windings of each motor and producing a current sensed signal for each winding.

34. An electric motor drive and power processing system as defined in claim 32, further including driver means for receiving the current sensed signals and producing switching signals to control the switching of the inverter switching elements.

35. An electric motor drive and power processing system as defined in claim 34, further including a reference generator for producing reference signals provided to the driver means for determining the phase of the electrical motor winding signals.

36. An electric motor drive and power processing system as defined in claim 35, further including:
   motor speed signal means for providing the motor speed to the reference generator;
   quotient means for dividing the motor speed by the voltage magnitude of the dc power source means and providing the resulting quotient to the reference generator; and
   a slip speed generator that provides a desired motor slip speed to the reference generator.

37. An electric motor drive and power processing system as defined in claim 35, further including recharge means for averaging the current sensed signals and receiving a recharge command signal to produce a recharge error signal that is summed with the current sensed signals and provided to the drivers.

38. An electric motor drive and power processing system that operates in a drive mode and in a recharge mode, comprising:
- a first polyphase motor having windings in a wye configuration with a first neutral node;
- a second polyphase motor having windings in a wye configuration with a second neutral node;
- bidirectional dc power source means for providing dc electrical power to the first and second motors and for receiving dc electrical power;
- a first polyphase, voltage-fed, pulse-width-modulated inverter having semiconductor switching elements for converting the electrical power from the dc power source means to electrical signals provided to the windings of the first motor;
- a second polyphase, voltage-fed, pulse-width-modulated inverter having semiconductor switching elements for converting the electrical power from the dc power source means to electrical signals provided to the windings of the second motor;
- a terminal connecting the first and second neutral nodes; and
- control means for controlling the switching elements of the first and second inverters such that single-phase ac electrical power applied at the terminal is converted to dc power delivered to the dc power source means in a unity power factor conversion, dc electrical power from the dc power source means is converted to single-phase ac electrical power delivered to the terminal, dc electrical power at the terminal is delivered to the dc power source means, and dc electrical power from the dc power source means is converted to dc power delivered to the terminal.

* * * * *